July 2, 1963
R. A. WARREN
3,096,216
VALVE FOR VENTING FLUID
Filed Jan. 2, 1962
2 Sheets-Sheet 1
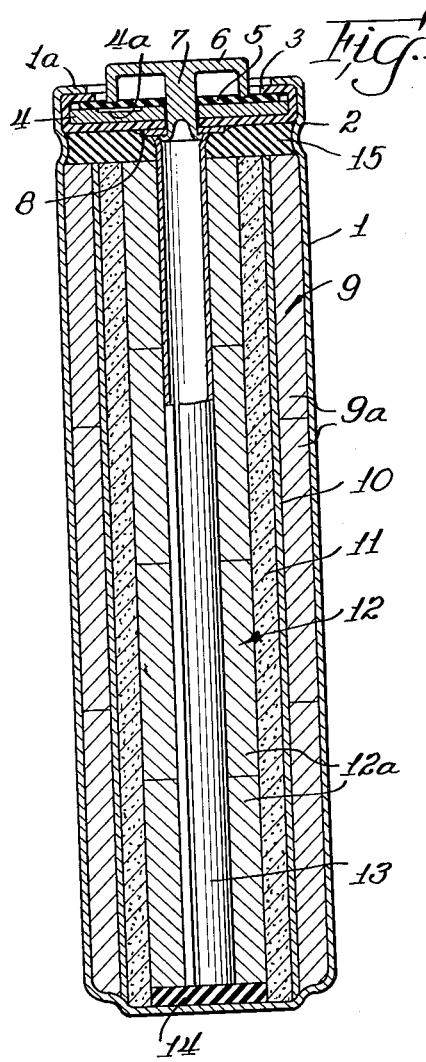
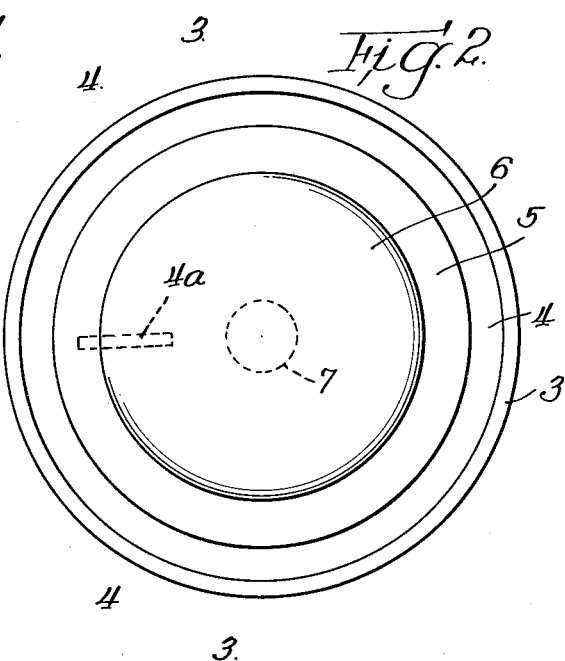
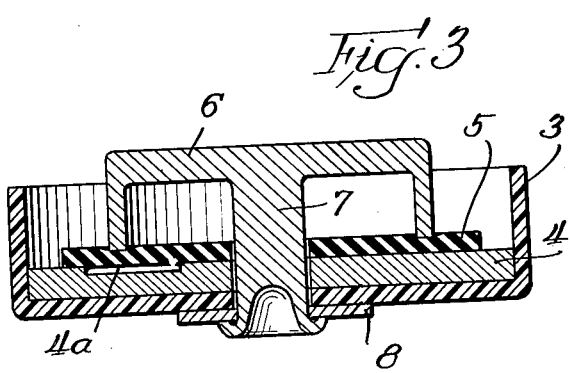
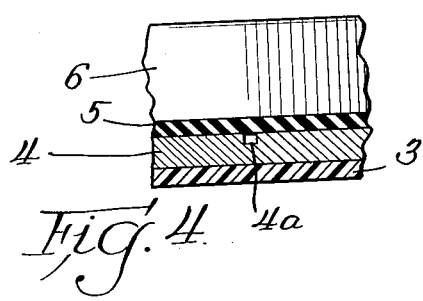
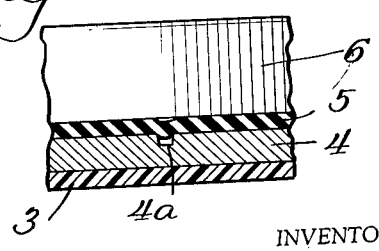
INVENTOR.
Robert A. Warren
BY
Darbo, Robertson & Vandenburgh
Att'ys.

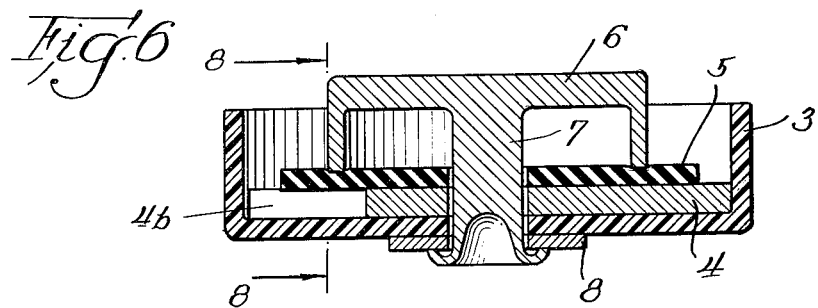
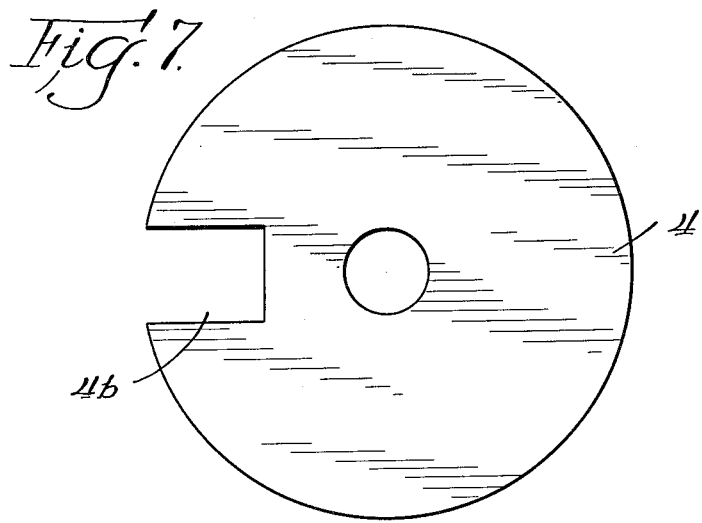
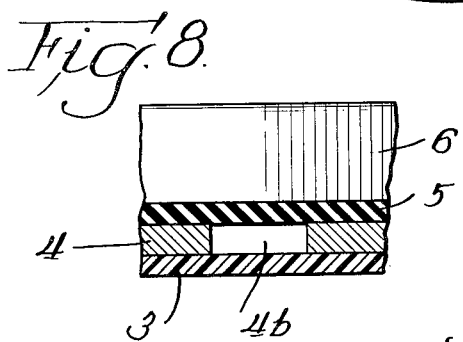
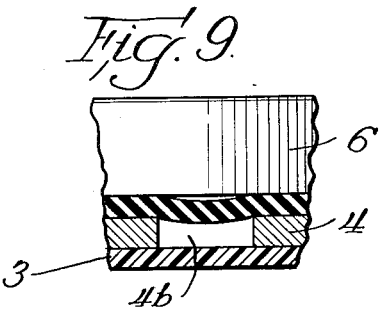
INVENTOR.
Robert A. Warren

_United States Patent Office_

3,096,216
Patented July 2, 1963

3,096,216
VALVE FOR VENTING FLUID
Robert A. Warren, Center Line, Mich., assignor to Servel, Inc., Evansville, Ind., a corporation of Delaware
Filed Jan. 2, 1962, Ser. No. 163,580
19 Claims. (Cl. 136—6)

This invention relates to a diaphragm valve adapted to remain in a hermetically sealed condition during normal operation of the device with which it is associated, but which permits the escape of fluid therethrough after a fluid pressure differential of predetermined value across the valve has been attained.

The invention more particularly relates to a valve for air-tight or hermetically sealed enclosures for voltaic cells which permit the relief venting of gases formed within the cell when an abnormally high gas pressure has been built up within the cell enclosure.

Although the invention is applicable to all types of voltaic cells, it is especially suitable for use in the construction of containers for cells utilizing alkaline electrolyte, where gas formation resulting in excessive internal pressures is frequently encountered.

Various types of alkaline cells are currently in widespread use. The characteristics common to all is that they utilize an electrolyte comprised of an aqueous solution of an alkali metal hydroxide as for example potassium hydroxide. The alkaline cells may be further categorized as either primary cells or secondary cells. The primary alkaline cell most commonly used has a zinc anode, preferably in the form of amalgamated zinc powder, and a cathode or depolarizer member of a readily reducible metallic oxide such as manganese dioxide or mercuric oxide.

The most common of the secondary cells is the so-called nickel-cadmium cell. This cell utilizes an anode comprised of powdered cadmium metal and a cathode comprised of an oxide of nickel. Still another commercial alkaline cell utilizes amalgamated zinc powder as the anode and silver oxide as the cathode.

Alkaline cells have enjoyed wide public acceptance for a number of reasons. The primary alkaline cell offers a discharge capacity of as much as three or four times as great as that of traditional dry cells of comparable size. The secondary cell offers the prime advantage that, since the reactions which take place during discharge and recharge so nearly approach reversibility, the cells may be charged and discharged through a large number of cycles before they are rendered unusable. Both primary and secondary alkaline cells have a low uniform internal impedance during discharge, and consequently the voltage under current drain remains almost constant until the cell is exhausted. An additional advantage enjoyed by both types is that high discharge rates may be used without causing harm to the cell.

In order to be suitable for general commercial use, alkaline cells, both primary and secondary, must be provided with air-tight or hermetically sealed containers. There are several reasons for this requirement. First, the cells are often used in expensive electronic equipment, where any leakage of the cell electrolyte must be prevented. Second, the cells must be sealed from the atmosphere, since carbon dioxide normally present in the atmosphere would react with the alkaline electrolyte to produce carbonates, exhausting the electrolyte and reducing the useful life of the cell.

During certain phases of the normal operation of an alkaline cell, gases may develop therein. In the primary cell, gases may develop during the latter part of the discharge period, especially if the cells are over-discharged. Gases may also form during normal discharge if the discharge rate is excessive. In the secondary cell, gases may be formed during excessively high discharge or over-discharge. In addition, gases are normally generated during the latter part of the charge cycle and during over-charge. Although excessive over-charge is undesirable, a certain amount must be tolerated by the cell since it is generally not practical to determine the exact point of full charge and to stop the charging process exactly at that point.

Numerous venting means for hermetically sealed or airtight cells have been disclosed in the prior art. In one type a closed crack or split is provided in the wall of the cell container, permitting the crack or split to rupture when the gas pressure becomes excessive. In another the cell wall is weakened at a point, enabling it to rupture at a predetermined gas pressure. In most cases, the means disclosed for venting gases may be characterized as emergency expedients and not adaptable for venting gases under normal continued use. Even when prior art means for venting gas under normal operating conditions have been disclosed, the means have not been susceptible of the necessary precision in predetermining the venting pressure.

It is an object of the invention to provide a valve for the controlled relief venting of fluids from an enclosure at a pressure which may be predetermined within precise limits.

It is further an object to provide a gas venting means for a voltaic cell enclosure which is relatively inexpensive and simple to construct.

It is further an object to provide a hermetically sealed voltaic cell enclosure having means for venting gases which have accumulated to form an abnormally high pressure, and wherein the sealed state is restored after sufficient gas has been vented to the atmosphere to restore the internal cell pressure to a value below that of the venting pressure.

Other objects and advantages of the invention will become more apparent from the following description when taken in conjunction with the accompanying drawing in which:

FIG. 1 is a cross-sectional view of a voltaic cell containing the venting valve of the invention;

FIG. 2 is an enlarged top view of the venting closure before it is inserted in the cell;

FIG. 3 is a cross-sectional view of the closure taken at the line 3—3 of FIG. 2;

FIG. 4 is a fragmental cross-sectional view taken at the line 4—4 of FIG. 2;

FIG. 5 is a view similar to that of FIG. 4, except that the closure is shown with the seal in venting position;

FIG. 6 is a cross-sectional view of a closure according to the invention in an alternative embodiment;

FIG. 7 is a plan view of a portion of the structure shown in FIG. 6;

FIG. 8 is a fragmental cross-sectional view taken at the line 8—8 of FIG. 6; and FIG. 9 is a fragmental cross-sectional view similar to that of FIG. 8 showing the valve in venting position.

Referring to the drawings, as shown in FIG. 1, the cell container is comprised of a steel cylindrical can 1 having a circular bead 2 provided near one end for supporting the closure structure. Above the bead is contained a sealing gasket 3 in the form of a cup composed of an electrically non-conductive sealing material such as nylon or neoprene. Within the sealing gasket is contained a rigid supporting disc 4 composed of a material such as steel. As is more clearly shown in FIGS. 2–5, a groove 4a is provided at one surface of the supporting disc 4. Supported by the disc 4 and affixed thereto as by cementing, is a sealing disc 5 of a flexible sealing material such as neoprene. A sealing cup 6 engages and forms a seal with the neoprene disc 5. Affixed to the sealing cup 6 is a vertical rivet shaft 7 extending through axial holes provided in the neoprene disc 5, the supporting disc 4, the nylon gasket 3, and through a hole in a metallic contact disc 8. The end of the rivet is upset over the contact disc with sufficient force to cause the edge of the sealing cup 6 to form a seal against the neoprene disc 5. The holes in all the structures through which the rivet shaft 7 passes are made sufficiently large so that gas can readily pass between the shaft and the edges of the holes, and enter the space defined between the sealing cup 6 and the neoprene disc 5. The edge 1a of the can is rolled over the sealing gasket 3 with sufficient force both radially and axially to cause the gasket to seal permanently against the edge of the steel supporting disc 4. The closure structure is supported axially by the bead 2.

Positioned in close electrical contact with the can 1 is a cylindrical depolarizer cathode 9. To promote ease of assembly, the cathode 9 is formed from a plurality of separately molded sleeve segments 9a which are individually inserted into the can.

A thin barrier membrane 10 is positioned at the inner surface of the tubular cathode to prevent the cathode material from migrating to the interior portion of the cell. Within the barrier membrane 10 is a tubular separator 11 composed of a bibulous material such as webril. The major proportion of the cell electrolyte is contained in the separator.

A tubular anode 12 is contained within the separator. The anode is comprised preferably of powdered metal molded under pressure in the form of short tubes 12a. A plurality of the tubes are inserted into the central portion of the cell.

In order to provide good electrical contact between the segments of the anode, and the external terminal of the cell, a contact spring member 13 is inserted inside the anode. In the form shown, the contact spring member is a split tube commonly termed a "roll pin." In order to provide good contact, the outer diameter of the roll pin should be slightly larger than the inner diameter of the anode, so that a constant outward radial force is exerted by the roll pin against the anode. The roll pin is in contact engagement with the turned over end of the rivet 7 and with the contact disc 8. An insulating disc 14 preferably of a resilient material such as neoprene both insulates the roll pin from the bottom of the can 1, and provides an upward axial force urging the roll pin against the contact disc 7. An insulating washer 15 separates the cell elements from the closure structure.

The material used for forming the cathode may be any one of the easily reducible metal oxides commonly used in the battery art, such as manganese dioxide, mercuric oxide, silver oxide, copper oxide or an oxide of nickel. When relatively non-conductive materials are used, as for example manganese dioxide or mercuric oxide, a minor proportion of a conductive material such as graphite or a carbon black such as acetylene black must be added in order to increase the conductivity of the depolarizing mixture. Silver oxide is generally in itself sufficiently conductive so that additional conductive materials need not be added. Suitable depolarizer compositions may be prepared by mixing together about nine parts manganese dioxide and about one part finely divided graphite, or about ten parts mercuric oxide and one part graphite. In the case of the nickel-cadmium cell, powdered metallic nickel may be added to the oxide in order to increase conductivity. The depolarizer mixture is preferably molded under pressure to the desired form. Where a tubular cathode is to be utilized, it has been found convenient to mold the cathode in the form of a plurality of tubes which are individually inserted, as shown in the drawing. The outer diameter of the depolarizer tubes should be so chosen that a tight press fit will result when they are inserted into the can 1, so that good electrical contact between the cathode and the can will result.

The function of the barrier member 10 is to prevent depolarizer particles from migrating to the central portion of the cell and thereby causing a short circuit. It must be composed of a material which is sufficiently resistant to the electrolyte so that it will not be decomposed, and yet must be sufficiently permeable so that the electrolyte may pass freely therethrough. Suitable barrier materials are parchment paper, sodium carboxymethylcellulose, porous polymeric films of a material such as vinyl chloride, and other barrier materials which are known to the art.

The bibulous separator 11 may be composed of any electrolyte-absorbent material which is not adversely affected thereby. A suitable material is webril, a nonwoven fabric made by blending thermoplastic fibers into a cotton web and applying heat and pressure.

The electrolyte may be chosen from among any of those suitable for the particular electrochemical system used. A preferred alkaline electrolyte has the following composition:

| | Percent |
|---|---|
| KOH | 28 |
| ZnO | 6 |
| $H_2O$ | 66 |

The zinc oxide component is utilized only where the anode is comprised of zinc. Its function is that of an inhibiting agent to protect the zinc anode from excessive dissolution in the electrolyte, especially during the period when no current is being drawn from the cell.

The anode is composed of an electronegative metal. In the mercury, manganese dioxide, and silver cells, zinc is the preferred anodic metal. The anode may be fabricated by placing the metal in the form of amalgamated powder into molds of desired size and shape, and molding the structure under pressure. In the case of a nickel-cadmium cell, the anode is comprised of powdered cadmium or, alternatively, cadmium oxide, when the cell is assembled in the discharged state.

One of several methods may be used for assembling the cell shown in the drawing. In one method the end of the can is first flared outwardly to form a flange so that the end portion has a diameter somewhat greater than that of the remaining portion of the can. The active cell ingredients are first inserted in the normal manner. The closure, comprised of the nylon gasket 3, the contact disc 8, the steel supporting disc 4, the neoprene sealing disc 5, and the sealing cup 6 having the rivet shaft 7 the end of which is upset over the contact disc 8 to provide clamping force, is then inserted into the enlarged portion of the cell.

An alternative embodiment of the invention is shown in FIGS. 6–9. Here instead of a groove in the supporting disc 4, one or more notches 4b may be provided therein, and serve the same function as that of the groove 4a shown in FIGS. 1–5, that is, the elimination of support at a limited area against the surface of the sealing disc 5. The lip of the can is then rolled over to retain the closure members. The can is finally drawn through a forming tool having a hole with a diameter only sufficiently great to permit the unflared portion of the can to pass freely through. As the entire can is forced through the hole, the flared portion is compressed radially inward with sufficient clamping force to provide a tight seal between the can 1, the sealing gasket 3, and the supporting disc 4. The closure structure is retained axially between the rolled over lip of the can and the circular groove or bead which results when the flange is drawn through the hole of the forming tool. Alternatively, a can of uniform diameter may be utilized, a bead rolled into the can wall above the upper limit of the active elements in such a manner as to act as a lower axial support for the closure. The closure elements are then inserted and the rim of the can rolled thereover to provide clamping force against the gasket and supporting disc.

The fluid venting valve according to the invention operates in the following manner: Under normal conditions the sealing disc 3 is supported by the supporting disc 4 in a substantially flat position with the edge of the supporting disc in sealing engagement with the sealing gasket 3 as the result of the clamping force supplied by the container lip 1a. A permanent air-tight or hermetic seal is thus provided between the edge of the supporting disc 4 and the container.

The holes provided in the contact disc 8, the gasket 3, the supporting disc 4, and the sealing disc 5 are sufficiently large so that a fluid, or gas in the case of voltaic cells, is free to pass between the rivet shaft 7 and the hole walls. Consequently, although a hermetic seal is provided between the edge of the supporting disc 4 and the container, a fluid may still pass freely from the interior of the container into the space between the sealing cup 6 and the neoprene sealing disc 5. Escape of the fluid within this cavity is prevented by the hermetic seal which is established as the result of the fact that the sealing cup lip is caused to bite into the neoprene disc 5, force for which is provided as a result of the upsetting of the end of the rivet shaft 7. Since the neoprene disc 5 and the supporting disc 4 are tightly clamped together and may even be cemented together, fluid is unable to escape therebetween.

When gas forms in the voltaic cell, the increased pressure causes the portion of the sealing disc 5 lying directly over the groove 4a or notch 4b to be pushed slightly thereinto, since support in that area is not provided for the sealing disc. When the pressure has increased sufficiently, the sealing disc is depressed into the groove or notch of the supporting disc to such an extent that the seal between the sealing disc and the lip of the sealing cup 6 is momentarily broken and gas is permitted to escape. When the pressure has once again been reduced as the result of the escape of the gas, a seal once more forms between the sealing cup lip and the sealing disc.

The pressure at which fluid will first vent is determined by several factors, one of which is the force used in upsetting the rivet end as the determinant of the normal clamping force exerted by the sealing cup lip against the neoprene sealing disc 5. Additionally, the venting pressure is determined by the size of the groove or notch of the supporting disc 4. An additional factor is the compressibility and resilience of the sealing disc 5. For applications in alkaline cells as described above, a gas venting pressure of 135 pounds per square inch has been found to be entirely satisfactory, and may be readily effected through the proper choice of the operative variables.

Although the invention has been described in detail in relation to only relatively few specific embodiments, it is to be understood that many variations may be practiced by those skilled in the art without departing from the spirit or scope thereof, within the limits defined by the appended claims.

Invention is claimed as follows:

1. A hermetically sealed fluid valve closure assembly for a container having an orifice, comprising a rigid centrally-apertured supporting member, means for sealing the edge of said supporting member to the wall of said container at its orifice, a centrally-apertured sealing disc composed of a resilient sealing material having one of its surfaces in sealing engagement with said supporting member, a valve member having a cup-form valve head the edge thereof engaging the other surface of said sealing disc throughout its periphery, and means providing axial clamping force of predetermined magnitude for clamping said sealing disc tightly between the edge of said valve head and said supporting member to form a seal between said valve head and said sealing disc, the surface of said supporting member engaging said sealing disc being provided with a gap of limited peripheral extent superimposed over a limited portion of the periphery of the edge of said valve head, sealing force against the edge of said valve head being applied at the area of said gap only by forces within said sealing disc resisting displacement of the portion thereof at the location of said gap, the arrangement being such that said container remains hermetically sealed under normal pressure conditions, and whereby increased pressure within said container of a predetermined magnitude causes the portion of said sealing disc over said gap to be sufficiently displaced as to break said seal temporarily and to permit fluid to escape from said container.

2. A hermetically sealed fluid valve closure assembly for a container having an orifice, comprising a rigid centrally-apertured supporting member, means for sealing the edge of said supporting member to the wall of said container at its orifice, a centrally-apertured sealing disc composed of a resilient sealing material having one of its surfaces in sealing engagement with said supporting member, a valve member having a cup-form valve head the edge thereof engaging the other surface of said sealing disc throughout its periphery and a valve stem extending through the central apertures of said sealing disc and said supporting member and being arranged to provide axial clamping force of predetermined magnitude for clamping said sealing disc tightly between the edge of said valve head and said diaphragm to form a seal between said valve head and said sealing disc, the surface of said supporting member engaging said sealing disc being provided with a gap of limited peripheral extent superimposed over a limited portion of the periphery of the edge of said valve head, sealing force against the edge of said valve head being applied at the area of said gap only by forces within said sealing disc resisting displacement of the portion thereof at the location of said gap, the arrangement being such that said container remains hermetically sealed under normal pressure conditions, and whereby increased pressure within said container of a predetermined magnitude causes the portion of said sealing disc over said gap to be sufficiently displaced as to break said seal temporarily and to permit fluid to escape from said container.

3. A valve closure assembly according to claim 3 wherein said supporting member is composed of steel and said sealing disc is composed of an elastomer.

4. A valve closure assembly according to claim 2 wherein said gap consists of a groove provided in the surface of said supporting member.

5. A valve closure assembly according to claim 2 wherein said gap consists of a notch provided in said supporting member.

6. In a voltaic cell comprising a metal container open at one end including therein electrodes consisting of a cathode and an anode, a bibulous separator interposed between said cathode and said anode having cell electrolyte absorbed therein, the improvement which comprises a hermetically sealed closure permitting venting of gas from said cell at a predetermined pressure, said closure comprising a rigid centrally-apertured supporting member, means for sealing the edge of said supporting member to the wall of said container at its open end, a centrally-apertured sealing disc composed of an electrically nonconductive resilient sealing material having one of its surfaces in sealing engagement with said supporting member, a valve member having a cup-form valve head at the edge thereof engaging the other surface of said sealing disc throughout its periphery, and means providing axial clamping force of predetermined magnitude for clamping said sealing disc tightly between the edge of said valve head and said supporting member to form a seal between said valve head and said sealing disc, the surface of said supporting member engaging said sealing disc being provided with a gap of limited peripheral extent superimposed over a limited portion of the periphery of the edge of said valve head, sealing force against the edge of said valve head being applied at the area of said gap only by force within said sealing disc resisting displacement of the portion thereof at the location of said gap, the arrangement being such that said container remains hermetically sealed under normal pressure conditions, and whereby increased pressure within said container of a predetermined magnitude causes the portion of said sealing disc over said gap to be sufficiently displaced as to break said seal temporarily and to permit fluid to escape from said container.

7. A voltaic cell according to claim 6 wherein said supporting member is composed of steel and said sealing disc is composed of an elastomer.

8. In a voltaic cell comprising a metallic container open at one end including therein electrodes consisting of a cathode and an anode, a bibulous separator interposed between said cathode and said anode having cell electrolyte absorbed therein, the improvement which comprises a hermetically sealed closure permitting venting of gas from said cell at a predetermined pressure, said closure comprising a rigid centrally-apertured-supporting member, means for sealing the edge of said supporting member to the cell of said container at its open end, a centrally-apertured sealing disc composed of an electrically non-conductive resilient sealing material having one of its surfaces in sealing engagement with said supporting member, an electrically conductive valve member having a cup-form valve head the edge thereof engaging the other surface of said sealing disc throughout its periphery and a valve stem extending through the central apertures of said sealing disc and said supporting member and being arranged to provide axial clamping force of predetermined magnitude for clamping said sealing disc tightly between the lip of said valve head and said supporting member to form a seal between said valve head and said sealing disc, the surface of said supporting member engaging said sealing disc being provided with a gap of limited peripheral extent superimposed over a limited portion of the periphery of the edge of said valve head, sealing against the edge of said valve head being applied at the area of said gap only by forces within said sealing disc resisting displacement of the portion thereof at the location of said gap, the arrangement being such that said container remains hermetically sealed under normal pressure conditions, and whereby increased pressure within said cell of a predetermined magnitude causes the portion of said sealing disc over said gap to be sufficiently displaced as to break said seal temporarily and to permit gas to escape from said cell.

9. In an alkaline primary cell comprising a cylindrical metallic can open at one end including therein electrodes consisting of a cathode and an anode, a bibulous separator interposed between said cathode and said anode having an alkaline electrolyte absorbed therein, the improvement which comprises a hermetically sealed enclosure for said can permitting the venting of gas from said cell at a predetermined pressure, said closure comprising a rigid centrally-apertured supporting member, means for sealing the edge of said supporting member to the wall of said can at its open end, a centrally-apertured sealing disc composed of an electrically non-conductive resilient sealing material having one of its faces in sealing engagement with said supporting member, a metallic valve member having a cup-form valve head the edge thereof engaging the other surface of said sealing disc throughout the periphery thereof and a valve stem extending through the central apertures of said sealing disc and said supporting member, the end of said valve stem being upset to provide clamping force of predetermined magnitude for clamping said sealing disc tightly between the lip of said valve head and said supporting member to form a seal between said valve head and said sealing disc, the surface of said supporting member engaging said sealing disc being provided with a gap of limited peripheral extent superimposed over a limited portion of the periphery of the edge of said valve head, sealing force against the edge of said valve head being applied at the area of said gap only by forces within said sealing disc resisting displacement of the portion thereof at the location of said gap, the arrangement being such that said cell remains hermetically sealed under normal pressure conditions, and whereby increased pressure within said cell of a predetermined magnitude causes the portion of said sealing disc over said gap to be sufficiently displaced as to break said seal temporarily and to permit gas to escape from said cell.

10. A primary cell according to claim 9 wherein said cathode is comprised of manganese dioxide and said anode is comprised of zinc.

11. A primary cell according to claim 9 wherein said cathode is comprised of mercuric oxide and said anode is comprised of zinc.

12. In an alkaline primary cell comprising a cylindrical metallic can and open at one end including therein electrodes consisting of a cathode and an anode, a bibulous separator interposed between said cathode and said anode having an alkaline electrolyte absorbed therein, the improvement which comprises a hermetically sealed closure for said can permitting venting of gases in said cell at a predetermined pressure, said closure comprising a rigid centrally-apertured supporting member composed of steel, a centrally-apertured sealing gasket composed of an electrically non-conductive resilient material disposed in sealing engagement over the edge of said supporting member, said gasket being clamped radially and axially between the wall of said can at its open end and the edge of said supporting member, a sealing disc composed of an electrically non-conductive resilient sealing material having one of its surfaces in sealing engagement with said supporting member, a metallic valve member having a cup-formed valve head engaging the other surface of said sealing disc throughout the periphery thereof and a valve stem extending through the central aperture of said sealing disc, said supporting member, and said sealing gasket, the end of said valve stem being upset to provide axial clamping force of predetermined magnitude for clamping said sealing disc tightly between the edge of said valve head and said supporting member to form a seal between said valve head and said sealing disc, the surface of said supporting member engaging said sealing disc being provided with a gap of limited peripheral extent superimposed over a limited portion of the periphery of the edge of said valve head, sealing force against the edge of said valve head being applied at the area of said gap only by forces within said sealing disc resisting displacement of the portion thereof at the location of said gap, the arrangement being such that said cell remains hermetically sealed under normal pressure conditions, and whereby increased pressure within said cell of a predetermined magnitude causes the portion of said sealing disc over said gap to be sufficiently displaced as to break said seal temporarily and to permit gas to escape from said cell.

13. A primary cell according to claim 12 wherein said gap comprises a groove disposed in the surface of said supporting member.

14. A primary cell according to claim 12 wherein said gap comprises a slot provided in said supporting member.

15. An alkaline cell according to claim 12 wherein said anode is comprised of amalgamated powdered zinc and said cathode is comprised of manganese dioxide.

16. A primary cell according to claim 12 wherein said anode is comprised of amalgamated powder zinc and said cathode is comprised of mercuric oxide.

17. In an alkaline secondary cell comprising a cylindrical metallic can open at one end including therein electrodes consisting of a cathode and an anode, bibulous separator interposed between said cathode and said anode having an alkaline electrolyte absorbed therein, the improvement which comprises a hermetically sealed closure for said can permitting venting of gases in said cell at a predetermined pressure, said closure comprising a rigid centrally-apertured supporting member composed of steel, a centrally-apertured sealing gasket composed of an electrically non-conductive resilient material disposed in sealing engagement over the edge of said supporting member, said gasket being clamped radially and axially between the wall of said can at its open end and the edge of said supporting member, a sealing disc composed of an electrically non-conductive resilient sealing material having one of its surfaces in sealing engagement with said supporting member, a metallic valve member having a cup-formed valve head the edge thereof engaging the other surface of said sealing disc throughout the periphery thereof and a valve stem extending through the central aperture of said sealing disc, said supporting member, and said sealing gasket, the end of said valve stem being upset to provide axial clamping force of predetermined magnitude for clamping said sealing disc tightly between the edge of said valve head and said supporting member to form a seal between said valve head and said sealing disc, the surface of said supporting member engaging said sealing disc being provided with a gap of limited peripheral extent superimposed over a limited portion of the periphery of the edge of said valve head, sealing force against the edge of said valve head being applied at the area of said gap only by forces within said sealing disc resisting displacement of the portion thereof at the location of said gap, the arrangement being such that said cell remains hermetically sealed under normal pressure conditions, and whereby increased pressure within said cell of a predetermined magnitude causes the portion of said sealing disc over said gap to be sufficiently displaced as to break said seal temporarily and to permit fluid to escape from said cell.

18. A secondary cell according to claim 17 wherein said cathode is comprised of silver oxide and said anode is comprised of zinc.

19. A secondary cell according to claim 17 wherein said anode is comprised of an oxide of nickel and said cathode is comprised of cadmium.

References Cited in the file of this patent

UNITED STATES PATENTS

| | | |
|---|---|---|
| 1,990,463 | Reinhardt | Feb. 5, 1935 |
| 2,062,107 | Reinhardt et al. | Nov. 24, 1936 |
| 2,829,186 | Kort | Apr. 1, 1958 |
| 2,934,584 | Warren et al. | Apr. 26, 1960 |